United States Patent
Chambers, Jr. et al.

(10) Patent No.: US 7,493,627 B2
(45) Date of Patent: Feb. 17, 2009

(54) SYSTEM AND METHOD FOR CONFIGURING COMPUTER FOR OPERATION

(75) Inventors: Howell Jack Chambers, Jr., Wake Forest, NC (US); Kevin Todd Henegar, Raleigh, NC (US); David Edward Karner, Raleigh, NC (US); Andrew Mark Mueller, Cary, NC (US)

(73) Assignee: LENOVO (Singapore) Pte. Ltd., Sinapore (SG)

( * ) Notice: Subject to any disclaimer, the term of this patent is extended or adjusted under 35 U.S.C. 154(b) by 859 days.

(21) Appl. No.: 10/922,264

(22) Filed: Aug. 19, 2004

(65) Prior Publication Data

US 2006/0041883 A1 Feb. 23, 2006

(51) Int. Cl.
G06F 9/44 (2006.01)
G06F 9/445 (2006.01)
(52) U.S. Cl. .................. 719/321; 719/327; 717/174
(58) Field of Classification Search ................. 719/321, 719/327; 717/174
See application file for complete search history.

(56) References Cited

U.S. PATENT DOCUMENTS

| | | | |
|---|---|---|---|
| 5,752,005 A | 5/1998 | Jones | 395/500 |
| 6,098,097 A | 8/2000 | Dean et al. | 709/220 |
| 6,356,915 B1 | 3/2002 | Chtchetkine et al. | 707/200 |
| 6,424,424 B1 | 7/2002 | Lomas et al. | 358/1.14 |
| 6,507,948 B1 | 1/2003 | Curtis et al. | 717/174 |
| 6,513,159 B1 | 1/2003 | Dodson | 717/178 |
| 6,519,633 B1 | 2/2003 | Kubik et al. | 709/220 |
| 6,542,892 B1 | 4/2003 | Cantwell | 707/10 |
| 6,611,915 B1 | 8/2003 | Kubik et al. | 713/200 |
| 7,356,679 B1* | 4/2008 | Le et al. | 713/1 |
| 2002/0124245 A1 | 9/2002 | Maddux et al. | 717/176 |
| 2003/0191911 A1* | 10/2003 | Kleinschnitz et al. | 711/154 |
| 2003/0236970 A1* | 12/2003 | Palmer et al. | 713/1 |
| 2004/0088685 A1 | 5/2004 | Pomanovic et al. | 717/140 |
| 2004/0117338 A1* | 6/2004 | Kennedy et al. | 707/1 |
| 2004/0268340 A1* | 12/2004 | Steeb et al. | 717/174 |

OTHER PUBLICATIONS

Application entitled: Software Dowload Method and System, U.S. Appl. No. 10/744,618, filed Dec. 23, 2003.
Kent F. Hayes, Jr., application entitled "Method, System and Program product for controlling Native Applications Using Open Service Gateway Initiative (OSGi) Bundles", U.S. Appl. No. 10/787,521, filed Feb. 26, 2004.

* cited by examiner

*Primary Examiner*—Li B Zhen
(74) *Attorney, Agent, or Firm*—John L. Rogitz

(57) ABSTRACT

A method for deploying software in a computer system includes providing a deployment maintenance mechanism (DMM) which includes drivers for hardware. A deployment mechanism which includes an image with drivers for hardware and which identifies hardware associated with the computer, along with a native operating system, are also provided. For hardware detected by the deployment mechanism and not having an associated driver in the image, a driver from the DMM is copied into the deployment mechanism using the native operating system. The native operating system is then re-booted to deploy drivers for hardware associated with the computer.

7 Claims, 2 Drawing Sheets

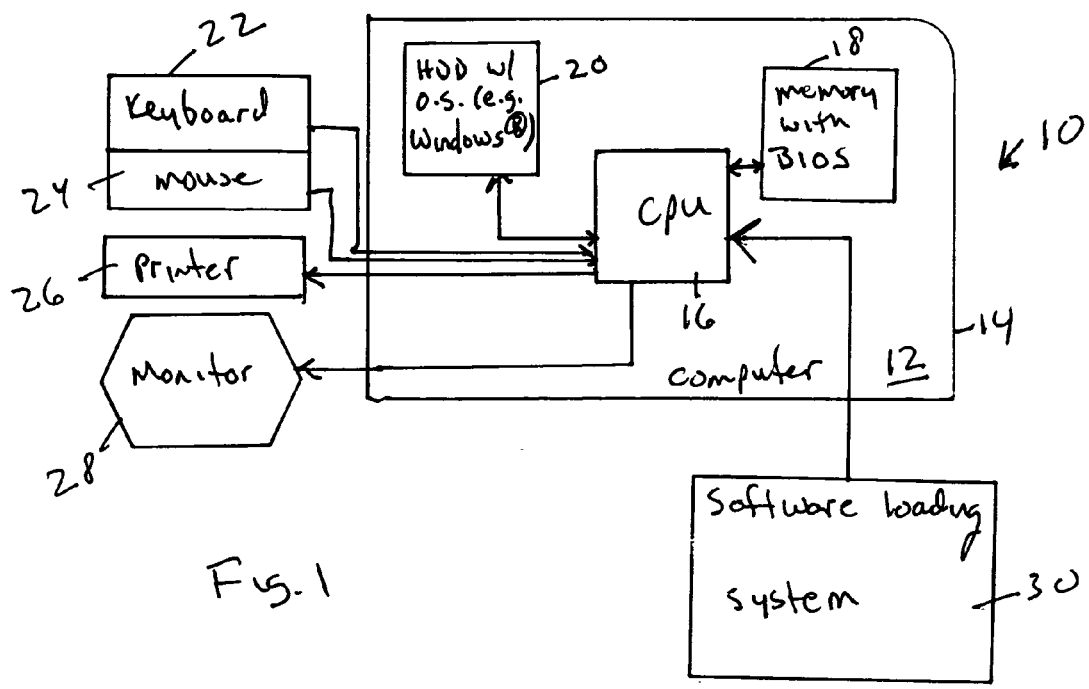
Fig. 1
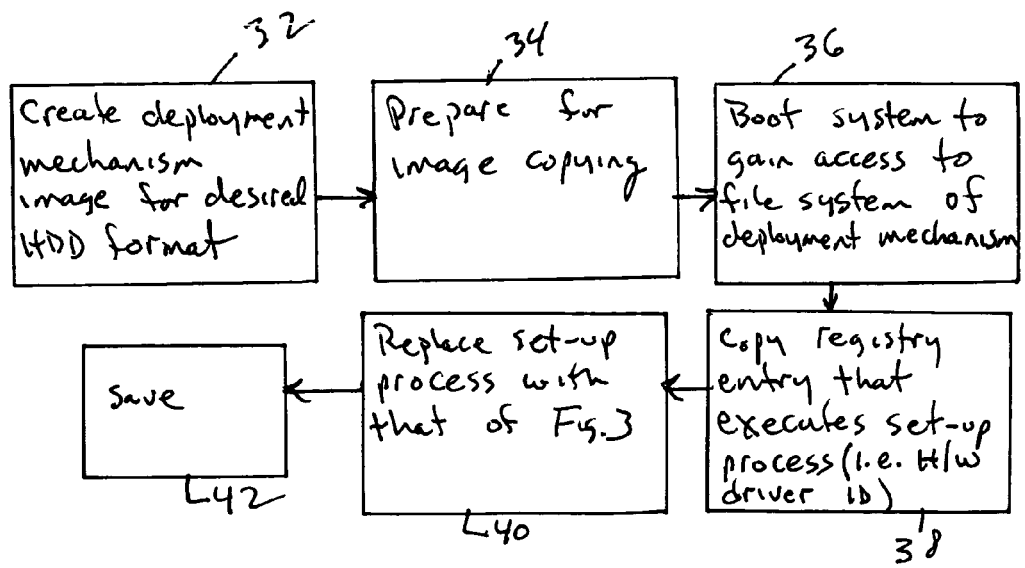
Fig. 2 preparation logic

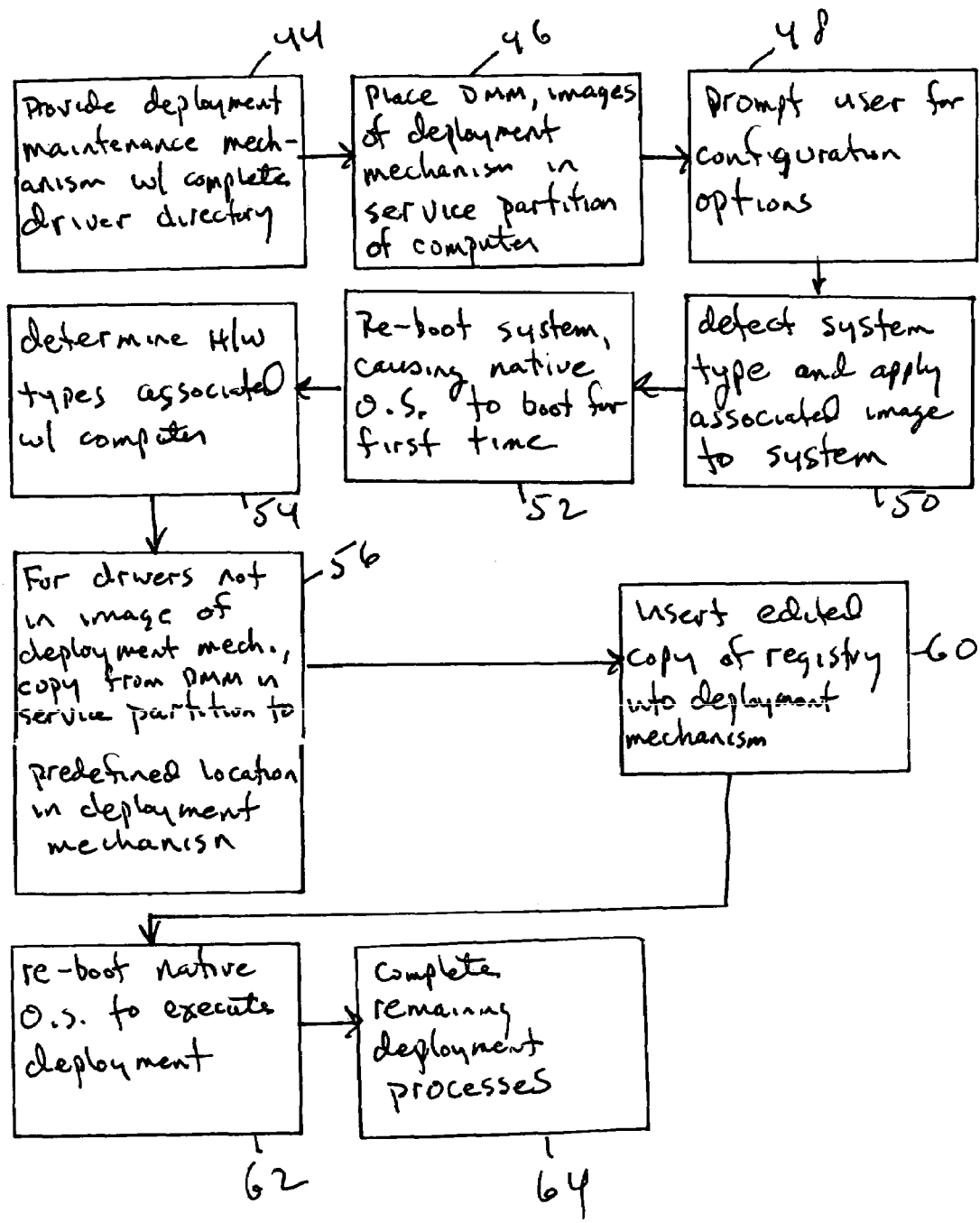

SYSTEM AND METHOD FOR CONFIGURING COMPUTER FOR OPERATION

FIELD OF THE INVENTION

The present invention relates generally to configuring computing devices for operation.

BACKGROUND OF THE INVENTION

New computers must be loaded with a significant amount of software, including the operating system of the computer. Additionally, programs called "drivers" must be loaded. "Drivers" facilitate communication with hardware such as mice, keyboards, printers, monitors, etc. that are associated with the computer. Also to be loaded are various user programs, typically referred to as "applications", including word processing programs, Internet browsers, email programs, etc.

Not surprisingly, the loading of new computers with software has become automated. Software deployment mechanisms such as IBM=s ImageUltra7 technology automatically detect the hardware that is being installed in a system (so that the correct drivers can be loaded) and dynamically "deploy", from an initial service partition into the operational regions of the HDD, the correct drivers and the native operating system. This provides a highly flexible mechanism to load software onto new computers.

As understood herein, the above-mentioned software deployment mechanism, while effective, consumes a lengthy amount of time. That is, while ImageUltra7 has a comprehensive database of various drivers, applications, and so on that can be loaded onto a new computer, it provides this support at the cost of time. For example, when it uses a Microsoft "Unattended Installation" process, forty five to ninety minutes can be required to install just the base operating system, after which applications are added which can add another twenty minutes to an hour to the process. Given these two installation phases, well over an hour can be required to load a computer with the necessary software. This can seem excessive in light of the relatively shorter time that some simpler and less comprehensive deployment mechanisms require, although these simpler systems disadvantageously are not hardware independent.

The present invention critically recognizes that some other deployment mechanisms exist, such as so-called "Sysprep" technology, that allow an operating system, hardware drivers, and core applications to be contained in a single package, also referred to herein as an "image", that quickly can be loaded into a new computer, significantly reducing the times noted above. The present invention further understands, however, that such image-based deployment mechanisms disadvantageously require hardware drivers to be contained in the image before the deployment process is started, meaning that some detected hardware might not be supported and; hence, that some required drivers will be missing. Moreover, post-processing steps contained within the image are locked in place. While the present invention recognizes that these limitations can be addressed by pushing driver files and post install files into the image before starting the deployment process, this would require that the base image either is in FAT32 format so it can be accessed from DOS (since the native operating system will not yet have been loaded) and/or use of a tool that can copy files from DOS into non-DOS partition types. Such non-DOS partition types are critical for customers desiring New Technology File System (NTFS)-based solutions.

As recognized herein, unfortunately DOS-based copying tools are very slow, thus offsetting the time gain. And, changes in a NTFS-based environment potentially may not be supported by the copying tool, making the use of DOS-based copying tools even less desirable. Having made the above critical observations, the present invention has been provided.

SUMMARY OF THE INVENTION

A method for deploying software in a computer system includes providing, in a service partition of a hard disk drive (HDD) that is associated with the computer, a deployment maintenance mechanism (DMM) such as but not limited to IBM's ImageUltra7 technology. The DMM includes drivers for hardware. Also loaded into the service partition is a deployment mechanism such as but not limited to the so-called "Sysprep" system, along with a native operating system such as but not limited to Windows7 for the computer. The deployment mechanism can be used to identify hardware that is associated with the computer, with the deployment mechanism being associated with an image containing drivers for hardware. For hardware detected by the deployment mechanism but that does not have an associated driver in the image, the method includes copying into the deployment mechanism a driver from the service partition using the native operating system. Then, the native operating system is re-booted to deploy drivers for hardware associated with the computer.

In non-limiting implementations the method can include receiving configuration options to identify an image to apply to the computer, prior to the copying step. Also, the non-limiting method may include booting the native operating system for an initial time, after the receiving step and before the copying step. Further, in some embodiments the method can include editing a copy of a driver registry of the deployment mechanism after the copying step, and inserting the copy of the driver registry into the deployment mechanism after the editing step. The re-booting step may be executed after the inserting step.

In another aspect, a computer system includes a central processing unit (CPU) and a storage that is accessible to the CPU. The storage is provided with a partition holding a native operating system, a software deployment mechanism including at least one computer system image, and a deployment management mechanism including plural drivers for hardware. Logic may be executed by the CPU to use the native operating system to add at least one hardware driver to the software deployment mechanism having an image not otherwise containing the driver.

In yet another aspect, a service for deploying software including a native operating system in a computer includes providing the operating system in a service partition of the computer, and providing a deployment management mechanism (DMM) in the service partition. The DMM has drivers for hardware. The service also includes providing a deployment mechanism in the service partition for use of an image associated therewith in deploying software in the computer. The deployment mechanism includes means for identifying hardware associated with the computer. It also has means for, for any hardware requiring a driver not associated with the image, obtaining the driver from the DMM using the native operating system.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of an exemplary computer system that can be configured for operation in accordance with disclosure herein;

FIG. 2 is a flow chart of the preparation logic; and

FIG. 3 is a flow chart of the deployment execution process.

DETAILED DESCRIPTION OF THE PREFERRED EMBODIMENT

Referring initially to FIG. 1, a computing system is shown, generally designated 10, that includes a user computer 12. The computer 12 can be any suitable computer, e.g., a personal computer or larger, a laptop computer, a notebook computer or smaller, etc.

As shown in FIG. 1, the preferred non-limiting computer 12 includes a housing 14 in which is mounted at least one main central processing unit (CPU) 16 that can communicate with a solid state memory 18 in the housing 14. The memory 18 can contain basic input/output system (BIOS) instructions useful for booting the computer 12 at start up. Additionally, other storage can be provided, e.g., a hard disk drive (HDD) 20 that can hold a copy of a native operating system, such as Windows7, for the computer 12 to load into memory 18 upon start up in accordance with operating system principles known in the art.

Various hardware components can be associated with the computer 12. For instance, a keyboard 22 and mouse 24 might be provided for input, while a printer 26 and a monitor 28 might be provided for output. Other hardware can be provided. Each hardware component requires that the CPU 16 be able to access an associated software-implemented driver to interact with the hardware component.

In accordance with principles set forth further below, a software loading system 30, such as a computer with storage that might be located at a vendor facility, can load into a service partition of the computer 12 various software, including the native operating system (such as but not limited to Windows7) of the computer 12, various software applications, and a deployment management mechanism (DMM) such as but not limited to IBM=s ImageUltra7 DMM. Also, a deployment mechanism such as but not limited to the so-called "Sysprep" program, as modified in accordance with principles set forth herein, can be loaded into the service partition. The service partition may be part of the HDD 20 or other storage component of the computer 12.

The present invention solves the problems noted above that are related to excessive time in deploying the native O.S. applications, and drivers by allowing the usage of the native O.S. file handling system to insert the system specific drivers into the deployment mechanism (such as "Sysprep") structure before the deployment mechanism fully executes. By using the native O.S. file handling system, the time required to push the drivers into NTFS solutions is greatly reduced. As set forth in greater detail below, in summary the standard deployment process is modified to copy in the required drivers to the deployment mechanism, after which a portion of the original process is replaced and rebooted to continue the deployment process with all of the required drivers in place. This offers the advantage of being able to add hardware drivers to a deployment mechanism without the original drivers being contained in the image used by the deployment mechanism. By using the native operating system to copy the drivers, significant time is eliminated from the process when compared to using DOS-based tools to insert the files.

Now referring to FIG. 2, the logic of the preparation phase commences at block 32, wherein the deployment mechanism image or images for the desired computer technology/system are created using any appropriate desired HDD format. Moving to block 34, in the exemplary non-limiting embodiment in which Microsoft "Sysprep" serves as the deployment mechanism, the conventional Sysprep step is executed to prepare for image distribution.

Proceeding to block 36, the system is booted with, e.g., Windows PE (possibly from CD-ROM or other appropriate storage) to allow full access to the file system of the deployment mechanism for making the following modifications to the deployment process. At block 38, a copy is made of the current registry entry or the deployment mechanism that is used to identify hardware associated with the computer 12, e.g., to execute the "Sysprep" Mini-Setup process when "Sysprep" is used as the deployment mechanism. The registry is edited to reflect newly discovered hardware and, hence, newly added drivers in accordance with principles set forth further below.

Moving to block 40, the conventional hardware identification (e.g., Mini-Setup) process is replaced with the process shown in FIG. 3 and described further below. The changes are saved at block 42, with the establishment of the deployment mechanism images being completed.

Now referring to FIG. 3, a complete deployment maintenance mechanism such as the above-mentioned ImageUltra7 program is provided with a complete driver directory that contains drivers for all of the systems that the computer 12 is designed to support. In addition, the images that are associated with the deployment mechanism (e.g., the "sysprep" program) that were created using the logic of FIG. 2 are also provided. All of this information, along with a copy of the native operating system, is placed into the service partition of, e.g., the HDD 20 when the computer 12 is shipped.

When the user receives the computer 12 and energizes it, at block 48 the user is prompted using, e.g., a menu for configuration options. Proceeding to block 50, the system type (Mobile/Desktop/Intellistation etc.) is detected, with the associated deployment mechanism image being applied to the computer 12. The system is rebooted at block 52, which causes the native operating system to boot for the first time.

Next, at block 54, owing to the above-disclosed replacement of the conventional hardware identification process with the process of the present invention in the preparation phase above, a detection process is run at block 56 that determines the type of system that is currently installing software, including what drivers are associated with the computer 12. This information is used to copy the files in the correct drivers' directory of the DMM in the service partition into a predefined location in the deployment mechanism program, for hardware drivers not already contained in the image of the deployment mechanism being used. In this way, hardware drivers are essentially added by the expedient of copying them from the DMM, which is less cumbersome and time-consuming than changing a deployment mechanism image every time a new hardware driver is needed. The driver registry is edited to reflect this.

At block 60 an edited the copy of the registry obtained in FIG. 2 is re-inserted into the deployment mechanism (e.g., into "Sysprep"). Block 62 indicates that the native O.S. of the computer 12 is rebooted, this time executing the conventional hardware identification and driver deployment process (e.g., by executing the "Sysprep Mini-Setup" process) but with a complete registry of needed drivers, which may be installed using, e.g., Windows Plug-N-Play detection routines. When this process is complete the deployment mechanism may re-boot, with remaining deployment processes being undertaken at block 64. Thus, the native file system (such as Windows) may be used to build sysprep bases with a NTFS solution already in place without requiring a time consuming conversion process for the file system.

While the particular SYSTEM AND METHOD FOR CONFIGURING COMPUTER FOR OPERATION as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A method for deploying software in a computer system comprising:
   providing, in a service partition of a hard disk drive (HDD) associated with the computer, at least a deployment maintenance mechanism (DMM) including drivers for hardware, a deployment mechanism and a native operating system also being provided, the deployment mechanism identifying hardware associated with the computer, the deployment mechanism being associated with an image containing drivers for hardware;
   for hardware detected by the deployment mechanism and not having an associated driver in the image, copying into the deployment mechanism a driver from the service partition using the native operating system;
   re-booting the native operating system at least to deploy drivers for hardware associated with the computer;
   receiving configuration options to identify an image to apply to the computer, prior to the copying act;
   booting the native operating system for an initial time, after the receiving act and before the copying act;
   editing a copy of a driver registry of the deployment mechanism after the copying act; and
   inserting the copy of the driver registry into the deployment mechanism after the editing act.

2. The method of claim 1, comprising executing the re-booting act after the inserting act.

3. A computer system, comprising:
   at least one central processing unit (CPU);
   at least one storage accessible to the CPU, the storage being provided with a partition holding a native operating system, a software deployment mechanism including at least one computer system image, and a deployment management mechanism (DMM) including at least plural drivers for hardware;
   logic executable by the CPU to undertake acts comprising:
      using the native operating system, adding at least one hardware driver to the software deployment mechanism having an image not containing the driver;
      for hardware detected by the deployment mechanism and not having an associated driver in the image, copying into the deployment mechanism a driver from the DMM into the deployment mechanism using the native operating system;
      re-booting the native operating system at least to deploy drivers for hardware associated with the computer;
      receiving configuration options to identify an image to apply to the computer, prior to executing the copying logic;
      booting the native operating system for an initial time, after executing the receiving logic and before executing the copying logic;
      editing the copy of the driver registry of the deployment mechanism after executing the copying logic; and
      inserting a copy of the driver registry into the deployment mechanism after editing the registry.

4. The system of claim 3, wherein the logic comprises executing the re-booting act after executing the inserting logic.

5. A service for deploying software including a native operating system in a computer, the service comprising:
   providing the operating system in a service partition of the computer;
   providing a deployment management mechanism (DMM) in the service partition, the DMM having at least some drivers for hardware; and
   providing a deployment mechanism in the service partition for use of an image associated therewith in deploying software in the computer, the deployment mechanism including means for identifying hardware associated with the computer and, means for, for any hardware requiring a driver not associated with the image, obtaining the driver from the DMM using the native operating system, wherein the deployment mechanism includes:
      means for editing a copy of a driver registry of the deployment mechanism after executing the obtaining means;
      means for receiving configuration options to identify an image to apply to the computer;
      means for booting the native operating system for an initial time, after executing the means for receiving and before executing the obtaining means;
      means for inserting the copy of the driver registry into the deployment mechanism after executing the means for editing.

6. The service of claim 5, wherein the deployment mechanism includes means for re-booting the native operating system at least to deploy drivers for hardware associated with the computer.

7. amended) The service of claim 5, wherein the deployment mechanism includes means for executing re-booting after executing the means for inserting.

* * * * *